(12) United States Patent
Zhang et al.

(10) Patent No.: US 12,410,675 B2
(45) Date of Patent: Sep. 9, 2025

(54) SEAL ASSEMBLY, AND SYSTEM

(71) Applicant: Baker Hughes Oilfield Operations LLC, Houston, TX (US)

(72) Inventors: Zhihui Zhang, Katy, TX (US); Guijun Deng, The Woodlands, TX (US); Emerson Nunez, Cypress, TX (US); Jason Harper, Cypress, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 0 days.

(21) Appl. No.: 18/326,159

(22) Filed: May 31, 2023

(65) Prior Publication Data
US 2024/0401429 A1 Dec. 5, 2024

(51) Int. Cl.
*E21B 33/12* (2006.01)
*F16J 15/02* (2006.01)

(52) U.S. Cl.
CPC ......... *E21B 33/1208* (2013.01); *F16J 15/022* (2013.01)

(58) Field of Classification Search
CPC ...... E21B 33/12; E21B 33/1208; F16J 15/022
See application file for complete search history.

(56) References Cited

U.S. PATENT DOCUMENTS

| | | | | |
|---|---|---|---|---|
| 5,297,805 A * | 3/1994 | Merkin | ............ | F16J 15/022 277/540 |
| 5,775,429 A * | 7/1998 | Arizmendi | ............ | E21B 33/128 166/387 |
| 6,343,791 B1 * | 2/2002 | Anyan | ............ | E21B 33/1216 277/342 |
| 7,363,970 B2 * | 4/2008 | Corre | ............ | E21B 33/1277 277/331 |
| 9,022,121 B1 * | 5/2015 | Penisson | ............ | E21B 34/00 166/325 |
| 9,109,269 B2 * | 8/2015 | Xu | ............ | C22C 27/04 |
| 10,047,261 B2 * | 8/2018 | Akulichev | ............ | C08K 3/01 |
| 10,759,092 B2 | 9/2020 | Yu et al. | | |
| 2008/0223588 A1 * | 9/2008 | Marshall | ............ | E21B 33/1216 166/138 |

(Continued)

FOREIGN PATENT DOCUMENTS

| | | |
|---|---|---|
| EP | 3567221 A1 | 11/2019 |
| GB | 2202283 A * 9/1988 | ......... E21B 33/1208 |

(Continued)

OTHER PUBLICATIONS

Notification of Transmittal of the International Search Report and the Written Opinion of the International Searching Authority, or the Declaration; PCT/2024/031240; Mail Date: Sep. 6, 2024; 10 pages.

*Primary Examiner* — Eugene G Byrd
(74) *Attorney, Agent, or Firm* — Baker Hughes Patent Organization

(57) ABSTRACT

A seal assembly, including a seal including a first lattice impregnated with a conformable resilient material, a backup including a second lattice impregnated with a conformable resilient material, the second lattice having a greater rigidity than the first lattice. A borehole system including a borehole in a subsurface formation, a string in the borehole, and a seal assembly disposed within or as a part of the string.

18 Claims, 4 Drawing Sheets

(56) References Cited

U.S. PATENT DOCUMENTS

| | | | |
|---|---|---|---|
| 2013/0256991 A1* | 10/2013 | Ramon | E21B 33/1208 |
| | | | 277/316 |
| 2015/0069711 A1 | 3/2015 | Johnson et al. | |
| 2015/0218903 A1* | 8/2015 | Sellers, Jr. | E21B 33/1291 |
| | | | 166/380 |
| 2017/0342797 A1 | 11/2017 | Murphree et al. | |
| 2022/0049571 A1 | 2/2022 | Glaesman et al. | |
| 2023/0091259 A1 | 3/2023 | Marya et al. | |
| 2024/0229594 A1* | 7/2024 | Zhong | E21B 33/128 |

FOREIGN PATENT DOCUMENTS

| | | | | |
|---|---|---|---|---|
| GB | 2355476 A * | 4/2001 | | E21B 33/1208 |
| GB | 2410264 A * | 7/2005 | | E21B 33/00 |
| WO | WO-2016133498 A1 * | 8/2016 | | E21B 33/1208 |
| WO | WO-2020197560 A1 * | 10/2020 | | B33Y 80/00 |

\* cited by examiner

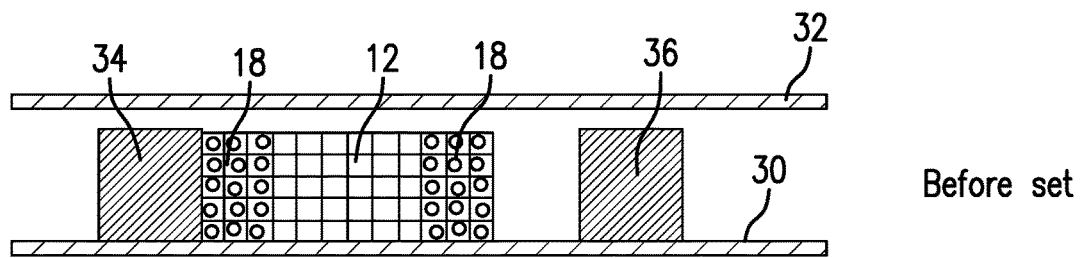
FIG.3 — Before set
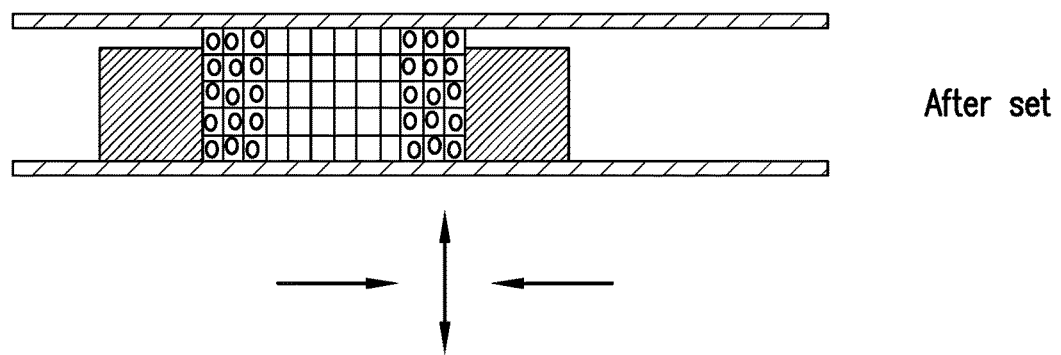
FIG.4 — After set
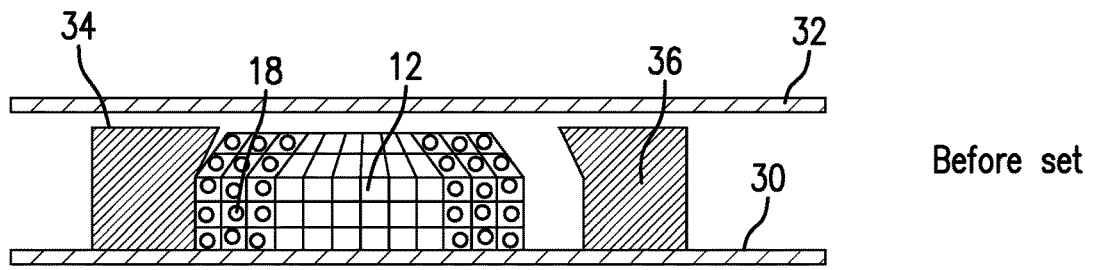
FIG.5 — Before set
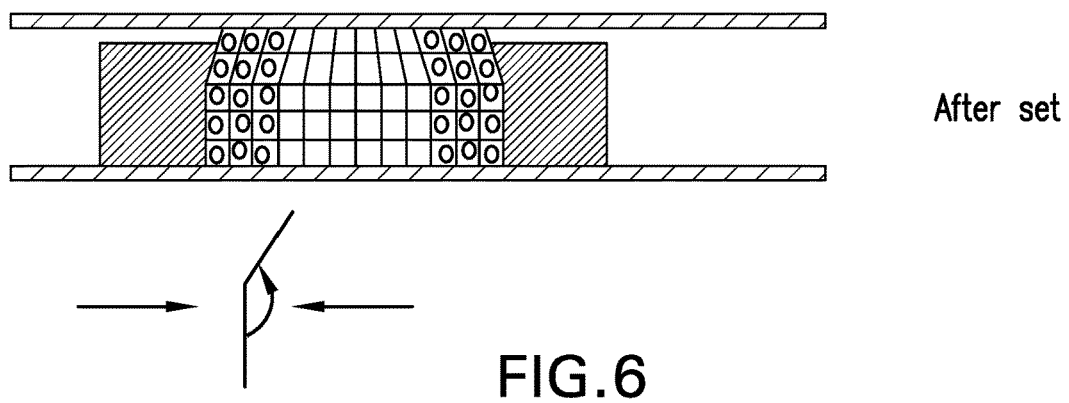
FIG.6 — After set Before set After set

SEAL ASSEMBLY, AND SYSTEM

BACKGROUND

In the resource recovery and fluid sequestration industries, sealing various parts relative to other parts is ubiquitous. Challenges abound due to temperature ranges and fluctuations, pressure ranges and fluctuations, and the complexities of systems to manage these. The art is always receptive to developments that improve the state of the art.

SUMMARY

An embodiment of a seal assembly, including a seal including a first lattice impregnated with a conformable resilient material, a backup including a second lattice impregnated with a conformable resilient material, the second lattice having a greater rigidity than the first lattice.

An embodiment of a borehole system including a borehole in a subsurface formation, a string in the borehole, and a seal assembly disposed within or as a part of the string.

BRIEF DESCRIPTION OF THE DRAWINGS

The following descriptions should not be considered limiting in any way. With reference to the accompanying drawings, like elements are numbered alike:

FIGS. 3 and 4 are schematic illustrations of the seal assembly of FIG. 1 in run in and set positions;

FIGS. 5 and 6 are schematic illustrations of an alternate configuration of seal assembly in run in and set positions;

DETAILED DESCRIPTION

A detailed description of one or more embodiments of the disclosed apparatus and method are presented herein by way of exemplification and not limitation with reference to the Figures.

Figure 1:
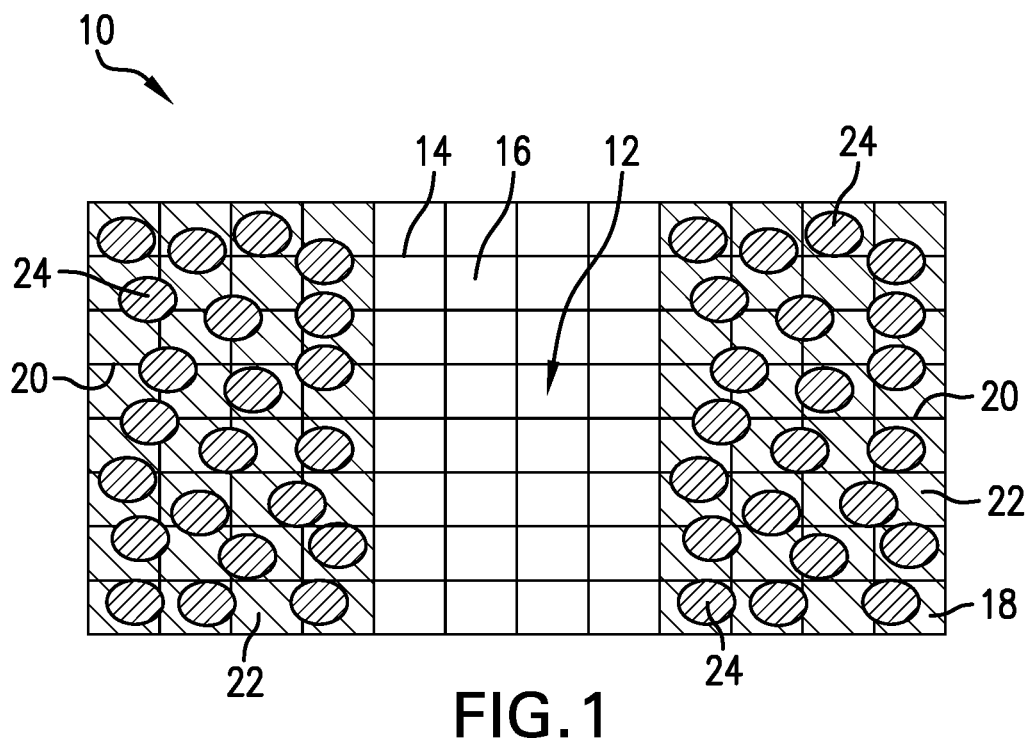
FIG. 1 is a schematic cross section view of a seal assembly as disclosed herein.

Referring to FIG. 1, a first embodiment of a seal assembly 10 is illustrated. Seal assembly 10 comprises a seal 12 including a first lattice 14 impregnated with a conformable resilient material 16. The lattice 14 is a geometric structure that exhibits a rigidity that is higher than that of the conformable resilient material 16. Lattice 16 may be of a metal such as stainless steel or a plastic such as polyether ether ketone (PEEK) and may have geometric shapes such as cubic, honeycomb, or other geometries. The conformable resilient material is a softer material that is suitable for creating a seal when urged into contact with another structure such as a casing. In embodiments, the material 16 may be a rubbery material such as Polytetrafuoroethylene (PTFE), Ethylene Propylene Diene Monomer (EPDM), Perfluoroalkoxy alkane (PFA), and other similar materials. In each case the material 16 is injected into the lattice 14 or is overmolded on the lattice 16.

Figure 2:
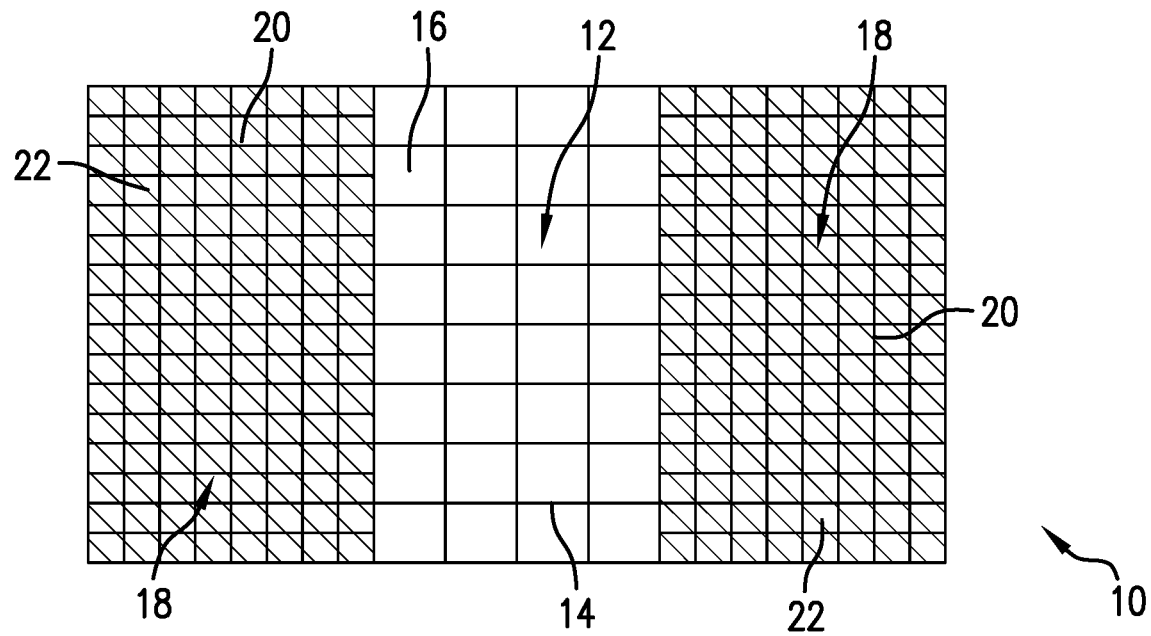
FIG. 2 is a schematic cross section view of another embodiment of a seal assembly as disclosed herein.

Still referring to FIG. 1, a backup 18 includes a second lattice 20 impregnated with a conformable resilient material 22 (which may be the same as material 16 or may be other similar materials. The second lattice 20 may be of the same rigidity as the first lattice 14 or may be of a higher rigidity than the first lattice 14. If the lattice 20 is the same rigidity as the lattice 14, as is illustrated in FIG. 1, then a particulate additive 24 is added to increase overall rigidity (lattice 20, material 22, and particulate 24) of the backup 18 relative to the overall rigidity (lattice 14, and material 16) of the seal 12. Alternatively, the second lattice 20 may have a greater rigidity than the first lattice 14 and be used without any particulate additive 24 as is illustrated in FIG. 2, where the size of the internal repeating shapes defined by the lattice 14 is different from the size of the shapes defined by the lattice 20. In embodiments, the greater rigidity may be due to an increase in the thickness of material used for the lattice 20 or may be due to the dimensions of the repeating units of the lattice in the lattice 20 vs lattice 14. In either case, the overall rigidity of the seal 12 and the backup 18 will be different in that the backup 18 will be of a higher rigidity than the seal 12. In embodiments where a particulate additive 24 is employed, the additive 24 may be spherical objects of stainless steel or other metals or materials not likely to plastically deform under loads associated with setting of the seal assembly 10. "Roundy" geometries improve flow characteristics of the additive 24 in the material 22. By "roundy" it is meant, spherical, oblate spheroids, prolate spheroids, tori, and other geometric shapes that have been rounded where corners, vertexes, or edges are normally presented. The additive 24 significantly increases rigidity of the backup 18. In an embodiment, a ratio of rigidity of backup to seal is about 1.1:1 to about 2:1, achievable with lattice 14 to lattice 20 difference alone, lattice 14 to lattice 20 difference plus additive 24, or lattice 14 and lattice 20 being the same but with an additive 24. In another embodiment, a volume percentage of lattice 20 and/or additive 24 to the total volume of the backup 18 is about 50% to about 85%. The volume percentage of lattice 14 in the seal 12 will be less than the percentage in the backup 18.

It is to be understood that in at least some of the embodiments, the seal 12 and backup 18 may be a single unit or may be different components like rings that are stacked next to one another. Further, the lattice 14 and 20 may be contiguous, with and different conformable resilient materials 16 and 22 impregnated in the locations illustrated for the seal 12 and backup 18.

Referring to FIGS. 3 and 4, the embodiment of FIG. 1 is illustrated in situ upon a mandrel 30 and inside of a casing 32 (any tubular structure). Gauge rings 34 and 36 are also illustrated and are clearly not compressing the seal assembly 10 in FIG. 3. In FIG. 4, however, the gauge rings 34 and 36 have been moved closer together to squeeze the seal assembly 10. The less rigid seal 12 expands radially outwardly more quickly than the more rigid backups 18 forming a seal against the casing 32. The backups 18 also expand radially outwardly into contact with the casing 32 and due to their rigidity prevent extrusion of the seal 12 during use.

Referring to FIGS. 5 and 6, an alternate embodiment is illustrated that uses different shapes for the seal 12 and backups 18 to promote certain shapes of radial expansion upon setting, as illustrated. It will be noted that the shape of the gauge rings is also different in that they are angled toward each other as then increase in distance from the mandrel 30. The embodiment increases extraction resistance by preferentially causing the backups 18 to angle toward one another.

Figure 7:
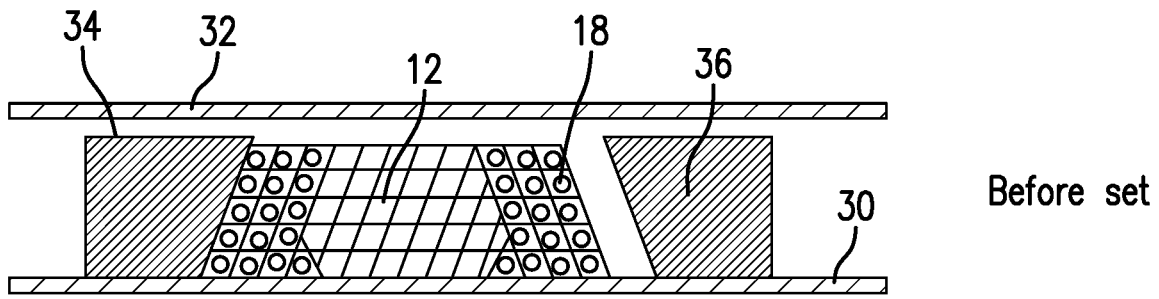
FIGS. 7 and 8 are schematic illustrations of another alternate configuration of seal assembly in run in and set positions.
Figure 8:
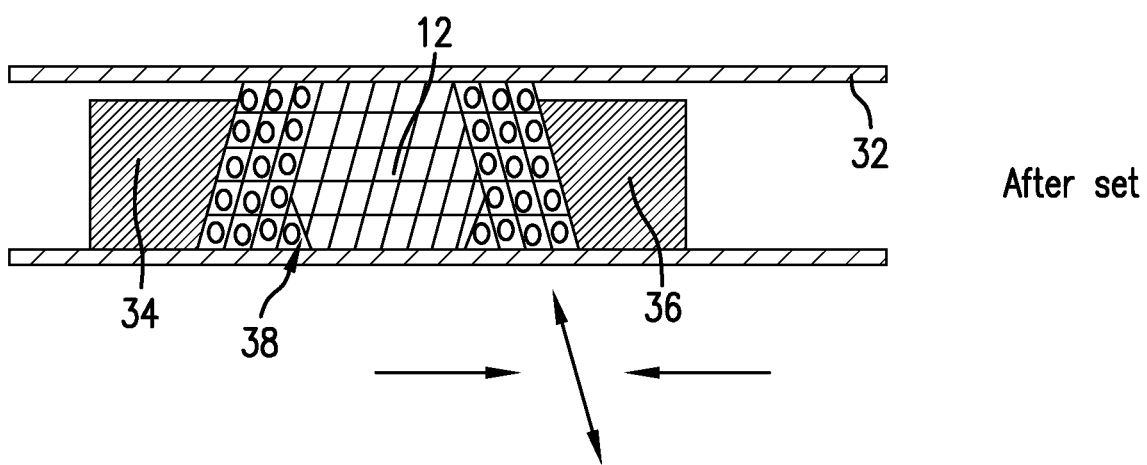

Referring to FIGS. 7 and 8, yet another embodiment is illustrated having anchor flanges 38. This embodiment exhibits a complex shape for the seal 12 and the backups 18.

The anchor flanges 38 tend to anchor the backups under the seal 12 during pressure reversals.

Figure 9:
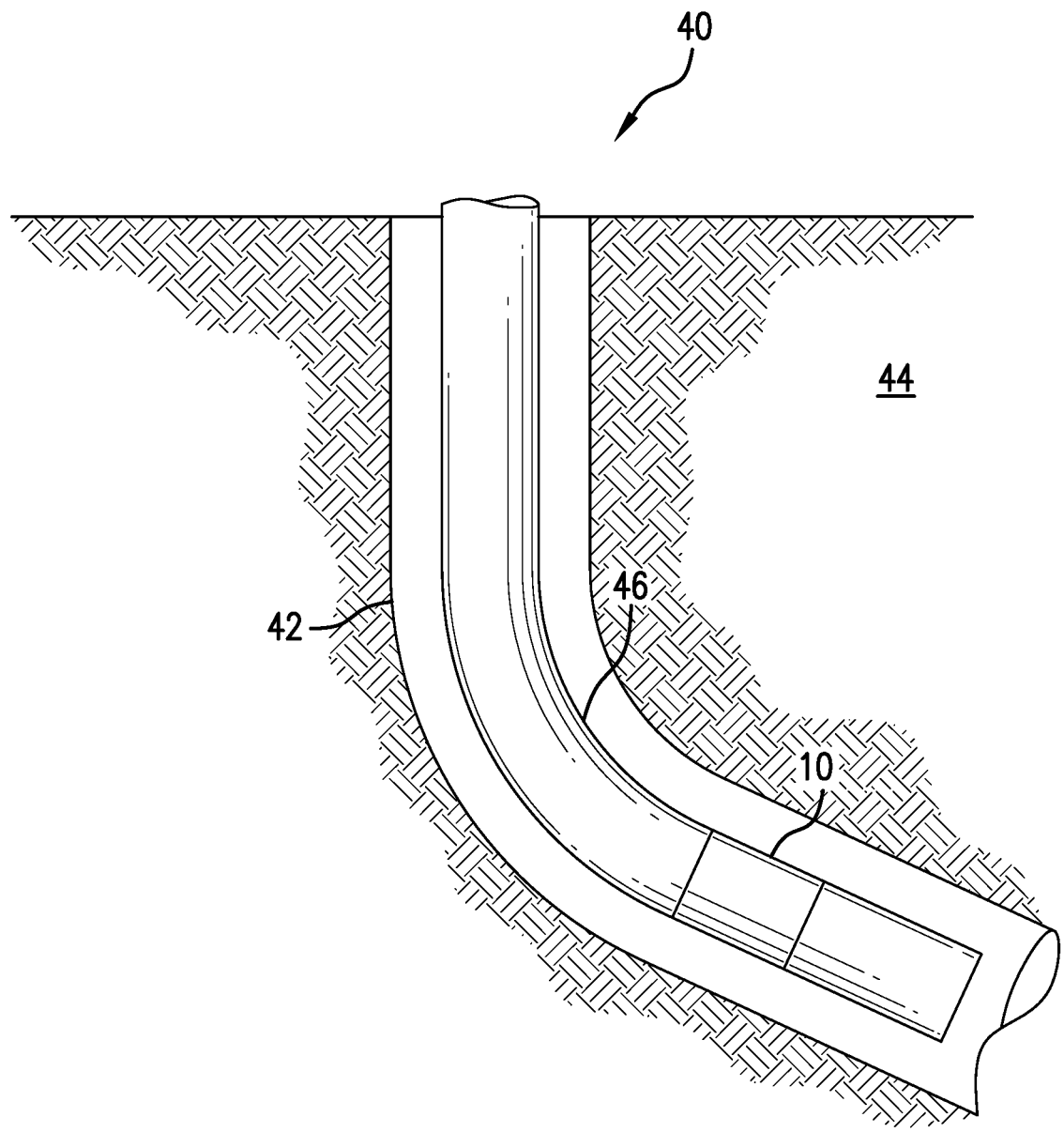
FIG. 9 is a view of a borehole system including a seal assembly as disclosed herein.

Referring to FIG. 9, a borehole system 40 is illustrated. The system 40 comprises a borehole 42 in a subsurface formation 44. A string 46 is disposed within the borehole 42. A seal assembly 10 as disclosed herein is disposed within or as a part of the string 46.

Set forth below are some embodiments of the foregoing disclosure:

Embodiment 1: A seal assembly, including a seal including a first lattice impregnated with a conformable resilient material, a backup including a second lattice impregnated with a conformable resilient material, the second lattice having a greater rigidity than the first lattice.

Embodiment 2: The seal assembly as in any prior embodiment, wherein the backup has a rigidity in a ratio of about 1.1:1 to about 2:1 with the seal.

Embodiment 3: The seal assembly as in any prior embodiment, further including a particulate additive dispersed in the conformable resilient material in the second lattice.

Embodiment 4: The seal assembly as in any prior embodiment, wherein the particulate additive is a spherical additive.

Embodiment 5: The seal assembly as in any prior embodiment, wherein the additive is stainless steel.

Embodiment 6: The seal assembly as in any prior embodiment, wherein the additive is of curvilinear geometry.

Embodiment 7: The seal assembly as in any prior embodiment, wherein the seal and the backup form a single piece structure.

Embodiment 8: The seal assembly as in any prior embodiment, wherein the first lattice and/or the second lattice defines shapes that are cubic in geometry.

Embodiment 9: The seal assembly as in any prior embodiment, wherein first lattice defines internal repeating shapes; the second lattice defines internal repeating shapes, and the shapes of the first lattice are smaller in dimension than the shapes of the second lattice.

Embodiment 10: The seal assembly as in any prior embodiment, wherein at least one of the first and second lattices comprise a metal material.

Embodiment 11: The seal assembly as in any prior embodiment, wherein the at least one of the first and second lattices comprise a plastic material.

Embodiment 12: The seal assembly as in any prior embodiment, wherein the metal material is stainless steel.

Embodiment 13: The seal assembly as in any prior embodiment, wherein the conformable resilient material of the seal material and the conformable resilient material of the backup material are the different materials.

Embodiment 14: The seal assembly as in any prior embodiment, wherein the conformable resilient material of the seal material and the conformable resilient material of the backup material are the same material.

Embodiment 15: The seal assembly as in any prior embodiment, wherein the conformable resilient material of the seal material and/or the conformable resilient material of the backup material comprises a polymeric material.

Embodiment 16: The seal assembly as in any prior embodiment, wherein the polymeric material includes poly tetra fluoroethelene, ethylene propylene diene monomer, perfluoroalkoxy alkane, and combinations including at least one of the foregoing.

Embodiment 17: The seal assembly as in any prior embodiment, wherein the seal exhibits a cross section, taken in parallel to a longitudinal axis of the seal assembly, that is a parallelogram.

Embodiment 18: The seal assembly as in any prior embodiment, wherein the seal exhibits a cross section, taken in parallel to a longitudinal axis of the seal assembly, having a larger dimension radially inwardly and a smaller cross section radially outwardly, Embodiment 19: The seal assembly as in any prior embodiment, wherein the backup exhibits a cross section, taken in parallel to a longitudinal axis of the seal assembly, that is a parallelogram.

Embodiment 20: A borehole system including a borehole in a subsurface formation, a string in the borehole, and a seal assembly as in any prior embodiment disposed within or as a part of the string.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The terms "about", "substantially" and "generally" are intended to include the degree of error associated with measurement of the particular quantity based upon the equipment available at the time of filing the application. For example, "about" and/or "substantially" and/or "generally" can include a range of +8% a given value.

The teachings of the present disclosure may be used in a variety of well operations. These operations may involve using one or more treatment agents to treat a formation, the fluids resident in a formation, a borehole, and/or equipment in the borehole, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A borehole seal assembly configured for deployment in a subsurface formation having a temperature range higher than ambient surface temperature, comprising:
   a seal including a first lattice impregnated with a conformable resilient material;
   a backup including a second lattice impregnated with a conformable resilient material, the second lattice having a greater rigidity than the first lattice, further including a particulate additive dispersed in the conformable resilient material in the second lattice, the particulate additive being of roundy geometry and being configured to not plastically deform under loads associated with setting of the seal assembly in the borehole, the particulate material storing energy when deformed, and wherein a volume percentage of the second lattice and/or additive to the total volume of the backup is about 50% to about 85%.

2. The seal assembly as claimed in claim 1, wherein the backup has a rigidity in a ratio of about 1.1:1 to about 2:1 with the seal.

3. The seal assembly as claimed in claim 2, wherein the particulate additive is a spherical additive.

4. The seal assembly as claimed in claim 2, wherein the additive is stainless steel.

5. The seal assembly as claimed in claim 1, wherein the seal and the backup form a single piece structure.

6. The seal assembly as claimed in claim 1, wherein the first lattice and/or the second lattice defines shapes that are cubic in geometry.

7. The seal assembly as claimed in claim 1, wherein first lattice defines internal repeating shapes; the second lattice defines internal repeating shapes, and the shapes of the first lattice are smaller in dimension than the shapes of the second lattice.

8. The seal assembly as claimed in claim 1, wherein at least one of the first and second lattices comprise a metal material.

9. The seal assembly as claimed in claim 1, wherein the at least one of the first and second lattices comprise a plastic material.

10. The seal assembly as claimed in claim 8, wherein the metal material is stainless steel.

11. The seal assembly as claimed in claim 1, wherein the conformable resilient material of the seal material and the conformable resilient material of the backup material are the different materials.

12. The seal assembly as claimed in claim 1, wherein the conformable resilient material of the seal material and the conformable resilient material of the backup material are the same material.

13. The seal assembly as claimed in claim 1, wherein the conformable resilient material of the seal material and/or the conformable resilient material of the backup material comprises a polymeric material.

14. The seal assembly as claimed in claim 12, wherein the polymeric material includes poly tetra fluoroethelene, ethylene propylene diene monomer, perfluoroalkoxy alkane, and combinations including at least one of the foregoing.

15. The seal assembly as claimed in claim 1, wherein the seal exhibits a cross section, taken in parallel to a longitudinal axis of the seal assembly, that is a parallelogram.

16. The seal assembly as claimed in claim 1, wherein the seal exhibits a cross section, taken in parallel to a longitudinal axis of the seal assembly, having a larger dimension radially inwardly and a smaller cross section radially outwardly.

17. The seal assembly as claimed in claim 1, wherein the backup exhibits a cross section, taken in parallel to a longitudinal axis of the seal assembly, that is a parallelogram.

18. A borehole system comprising:
a borehole in a subsurface formation;
a string in the borehole; and
a seal assembly as claimed in claim 1 disposed within or as a part of the string.

* * * * *